United States Patent
Shen et al.

(10) Patent No.: US 11,694,420 B2
(45) Date of Patent: Jul. 4, 2023

(54) IMAGE STITCHING DEVICE AND IMAGE STITCHING METHOD

(71) Applicant: Faurecia Clarion Electronics (Xiamen) Co., Ltd., Fujian (CN)

(72) Inventors: Chen Shen, Fujian (CN); Jie Qiu, Fujian (CN)

(73) Assignee: FAURECIA CLARION ELECTRONICS (XIAMEN) CO., LTD., Fujian (CN)

( * ) Notice: Subject to any disclaimer, the term of this patent is extended or adjusted under 35 U.S.C. 154(b) by 60 days.

(21) Appl. No.: 17/321,876

(22) Filed: May 17, 2021

(65) Prior Publication Data

US 2021/0366089 A1   Nov. 25, 2021

(30) Foreign Application Priority Data

May 20, 2020   (CN) .......................... 202010430528.8

(51) Int. Cl.
| | |
|---|---|
| G06V 10/00 | (2022.01) |
| G06V 10/10 | (2022.01) |
| G06T 5/50 | (2006.01) |
| G06T 5/00 | (2006.01) |
| G06T 7/11 | (2017.01) |
| G06V 10/25 | (2022.01) |
| G06V 10/56 | (2022.01) |

(52) U.S. Cl.
CPC .............. *G06V 10/10* (2022.01); *G06T 5/009* (2013.01); *G06T 5/50* (2013.01); *G06T 7/11* (2017.01); *G06V 10/25* (2022.01); *G06V 10/56* (2022.01); *G06T 2207/20021* (2013.01); *G06T 2207/20221* (2013.01); *G06V 10/16* (2022.01)

(58) Field of Classification Search
CPC ......... G06T 2207/20221; G06T 3/4038; G06T 2200/32; H04N 5/23238; H04N 1/3876; G06V 10/16; G06V 10/10

See application file for complete search history.

(56) References Cited

U.S. PATENT DOCUMENTS

| | | | | |
|---|---|---|---|---|
| 2003/0234866 A1* | 12/2003 | Cutler | ....................... | G06T 5/40 348/E9.051 |
| 2005/0213849 A1* | 9/2005 | Kreang-Arekul | ......... | G06T 5/40 382/284 |

(Continued)

FOREIGN PATENT DOCUMENTS

CN   105321151 A   2/2016

*Primary Examiner* — Li Liu

(74) *Attorney, Agent, or Firm* — Morgan, Lewis & Bockius LLP

(57) ABSTRACT

An image stitching method includes: receiving a first image and a second image; determining that both the first image and the second image include a target object; obtaining a first brightness value and a second brightness value, the first brightness value being a brightness value of the target object in the first image, and the second brightness value being a brightness value of the target object in the second image; adjusting a brightness value of the first image and a brightness value of the second image according to the first brightness value and the second brightness value, so as to obtain a first image to be stitched and a second image to be stitched; and stitching the first image to be stitched and the second image to be stitched to obtain a first stitched image.

14 Claims, 11 Drawing Sheets

(56) References Cited

U.S. PATENT DOCUMENTS

| | | | |
|---|---|---|---|
| 2017/0352138 A1* | 12/2017 | Wang | G06T 5/009 |
| 2018/0005410 A1* | 1/2018 | Wang | G06T 11/60 |
| 2018/0035047 A1* | 2/2018 | Lei | H04N 5/265 |
| 2018/0082454 A1* | 3/2018 | Sahu | H04N 9/69 |
| 2018/0315193 A1* | 11/2018 | Paschalakis | G06K 9/6269 |

\* cited by examiner

IMAGE STITCHING DEVICE AND IMAGE STITCHING METHOD

CROSS-REFERENCE TO RELATED APPLICATION

This application claims priority to Chinese Patent Application No. 202010430528.8, filed on May 20, 2020, which is incorporated herein by reference in its entirety.

TECHNICAL FIELD

The present disclosure relates to the technical field of image processing, and in particular, to image stitching devices and image stitching methods.

BACKGROUND

High-definition cameras are generally installed on side-view mirrors of a vehicle and are used to capture images which are then displayed on a display screen of the vehicle.

SUMMARY

In one aspect, the present invention provides an image stitching device, including: a communications interface configured to receive a first image and a second image; and a processor connected to the communications interface and configured to: determine that both the first image and the second image include a target object; obtain a first brightness value and a second brightness value, the first brightness value being a brightness value of the target object in the first image, and the second brightness value being a brightness value of the target object in the second image; adjust a brightness value of the first image and a brightness value of the second image according to the first brightness value and the second brightness value, so as to obtain a first image to be stitched and a second image to be stitched; the first image to be stitched having a same brightness range as the second image to be stitched; and stitch the first image to be stitched and the second image to be stitched to obtain a first stitched image.

In another aspect, the present invention provides an image stitching device, including: a communications interface configured to receive a first image, a second image, and a third image; and a processor connected to the communications interface and configured to: determine that both the first image and the second image include a first target object, and that both the second image and the third image include a second target object; divide the second image into a plurality of regions that include at least a first region and a second region, the first region being a region of the second image in which the first target object is located, and the second region being a region of the second image in which the second target object is located; obtain a first brightness value, a second brightness value, a third brightness value and a fourth brightness value, the first brightness value being a brightness value of the first target object in the first image, the second brightness value being a brightness value of the first target object in the second image, the third brightness value being a brightness value of the second target object in the third image, and the fourth brightness value being a brightness value of the second target object in the second image; adjust a brightness value of the first image according to the first brightness value and the second brightness value, so as to obtain a first image to be stitched and determine a first conversion coefficient, and the first conversion coefficient including brightness conversion coefficients corresponding to the first region; adjust a brightness value of the third image according to the third brightness value and the fourth brightness value, so as to obtain a third image to be stitched and determine a second conversion coefficient, and the second conversion coefficient including brightness conversion coefficients corresponding to the second region; adjust a brightness value of the second image according to the first conversion coefficient and the second conversion coefficient, so as to obtain a second image to be stitched; and stitch the first image to be stitched, the second image to be stitched, and the third image to be stitched to obtain a stitched image.

In yet another aspect, an image stitching method is provided, including: receiving a first image and a second image; determining that both the first image and the second image include a target object; obtaining a first brightness value and a second brightness value, the first brightness value being a brightness value of the target object in the first image, and the second brightness value being a brightness value of the target object in the second image; adjusting a brightness value of the first image and a brightness value of the second image according to the first brightness value and the second brightness value, so as to obtain a first image to be stitched and a second image to be stitched, and the first image to be stitched having a same brightness range as the second image to be stitched; and stitching the first image to be stitched and the second image to be stitched to obtain a first stitched image.

In yet another aspect, an image stitching method is provided, including: receiving a first image, a second image, and a third image; determining that both the first image and the second image include a first target object, and determining that both the second image and the third image include a second target object; dividing the second image into a plurality of regions, the plurality of regions including at least a first region and a second region, the first region being a region of the second image in which the first target object is located, and the second region being a region of the second image in which the second target object is located; obtaining a first brightness value, a second brightness value, a third brightness value, and a fourth brightness value, the first brightness value being a brightness value of the first target object in the first image, the second brightness value being a brightness value of the first target object in the second image, the third brightness value being a brightness value of the second target object in the third image, and the fourth brightness value being a brightness value of the second target object in the second image; adjusting a brightness value of the first image according to the first brightness value and the second brightness value, so as to obtain a first image to be stitched and determine a first conversion coefficient, and the first conversion coefficient including brightness conversion coefficients corresponding to the first region; adjusting a brightness value of the third image according to the third brightness value and the fourth brightness value, so as to obtain a third image to be stitched and determine a second conversion coefficient, and the second conversion coefficient including brightness conversion coefficients corresponding to the second region; adjusting a brightness value of the second image according to the first conversion coefficient and the second conversion coefficient, so as to obtain a second image to be stitched; and stitching the first image to be stitched, the second image to be stitched, and the third image to be stitched to obtain a stitched image.

In another aspect, a non-transitory computer-readable storage medium is provided. The non-transitory computer-readable storage medium stores one or more computer programs, and the one or more computer programs include computer instructions that, when executed by an image stitching device, cause the image stitching device to perform steps in the image stitching methods as described above.

In yet another aspect, a computer program product is provided. The computer program product includes computer instructions stored in a non-transitory computer-readable storage medium. When executed by a computer, the computer instructions cause the computer to perform steps in the image stitching methods as described above.

BRIEF DESCRIPTION OF THE DRAWINGS

In order to describe technical solutions in the embodiments of the present disclosure more clearly, accompanying drawings to be used in description of embodiments will be introduced briefly. However, the accompanying drawings to be described below are merely some embodiments of the present disclosure, and those of ordinary skill in the art may obtain other drawings according to those drawings without paying any creative effort.

DETAILED DESCRIPTION

Figure 1:
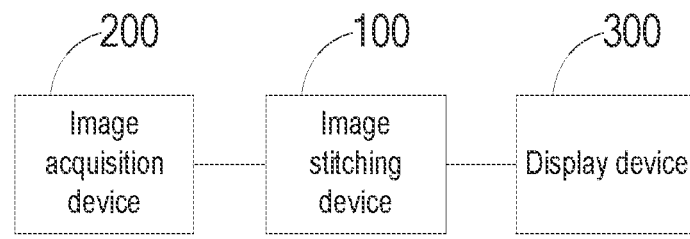
FIG. 1 is a block diagram of an image stitching system, in accordance with some embodiments.

Technical solutions in some embodiments of the present disclosure will be described below clearly and completely with reference to the accompanying drawings. However, the described embodiments are merely some but not all embodiments of the present disclosure. All other embodiments obtained by a person of ordinary skill in the art based on the embodiments provided by the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "included, but not limited to." In the description, the terms such as "one embodiment," "some embodiments," "exemplary embodiments," "example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

The terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the present disclosure, "a plurality of", "the plurality of" and "multiple" mean two or more unless otherwise specified.

It will be understood that when it is described that an element is "connected" to another element, the element may be directly connected to another element, or connected to another element through a third element. On the contrary, it will be understood that when an element is referred to as "directly connected to" another element, other elements will not intervene therebetween.

The use of "configured to" herein is meant as open and inclusive language, which does not exclude devices applicable to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited.

As used herein, the term "if" is optionally construed as "when" or "in a case where" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In an application scenario, a plurality of cameras may be installed on a vehicle's body to capture images of a sense behind the vehicle from multiple views. For example, two cameras are installed on side-view mirrors (i.e., a left mirror and a right mirror), respectively. In another example, besides the two cameras installed on the side-view mirrors, another camera may be installed on a rear window of the vehicle. In yet another example, the camera installed on the rear window may be replaced by a camera installed on a rear-view mirror of the vehicle. In this multiple-camera application scenario, images captured by the plurality of cameras may be stitched together to form a stitched image which will be displayed on the display screen of the vehicle latter. However, during the procedure of stitching the images, since the images are captured by different cameras, the exposure values of the images may be different. As a result, exposure values of different regions of the stitched image may be different, which may affect the display effect of the stitched image.

FIG. 1 shows a block diagram of an image stitching system, in accordance with some embodiments. As shown in FIG. 1, the image stitching system includes an image stitching device 100, at least one image acquisition device 200, and a display device 300. The image stitching device 100 and the display device 300 may be one integral piece or may be separated. The image stitching device 100 may communicate with the image acquisition devices 200 and the display device 300.

The image stitching device 100 may be an electronic control unit (ECU) of an electronic mirror (e-mirror). The image stitching device 100 is configured to stitch images captured by the image acquisition devices 200 and send a stitched image to the display device 300.

In some examples, the image stitching device 100 may stitch images captured at the same time by the at least one image acquisition devices 200. For example, the image stitching device 100 may stitch images captured at the same time by the image acquisition devices 200 installed on the side-view mirrors and the rear window. In some other examples, the image stitching device 100 may be also used to stitch images that are successively captured by a single image acquisition device 200 in different rotation angles, so as to obtain a panoramic image.

The at least one image acquisition device 200 is configured to capture images and send the captured images to the image stitching device 100. For example, the image acquisition device 200 may be a camera. The at least one image acquisition device 200 includes a plurality of image acquisition devices 200, and the image acquisition devices 200 may be installed on front faces of the rear-view mirrors of the vehicle, or may also be installed on rear faces of the rear-view mirrors, or may also be installed on side faces of the rear-view mirrors, which is not limited herein.

The display device 300 is configured to receive the stitched image sent by the image stitching device 100 and display the stitched image. The display device 300 may be an e-mirror.

Figure 2:
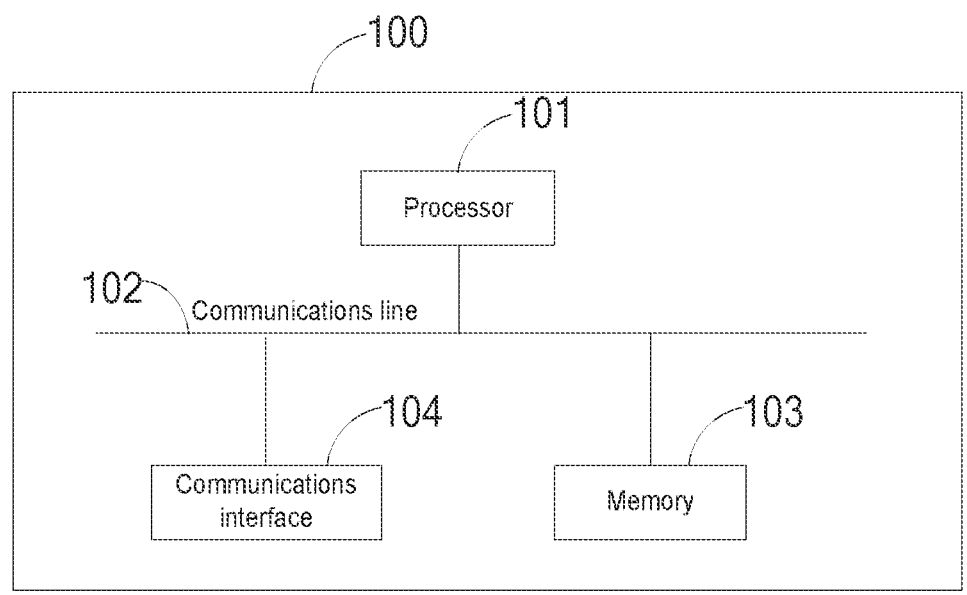
FIG. 2 is a block diagram of an image stitching device, in accordance with some embodiments.

FIG. 2 shows hardware architecture of the image stitching device 100. In some embodiments, as shown in FIG. 2, the image stitching device 100 includes at least one processor 101, a communications line 102, a memory 103, and a communications interface 104.

In some examples, the at least one processor 101 is configured to execute computer instructions stored in the memory 103, so as to implement steps or actions performed by the image stitching device 100.

The processor 101 may be a chip. For example, the processor 101 may be a field programmable gate array (FPGA), an application specific integrated circuit (ASIC), a system on chip (SoC), a central processor unit (CPU), a network processor (NP), a digital signal processor (DSP), a micro controller unit (MCU), a programmable logic device (PLD), or other integrated chips.

The communications line 102 is configured to transmit information between the processor 101 and the memory 103. The communication line 102 may be a system bus.

The memory 103 is configured to store the computer instructions. The computer instructions may be executed by the processor 101 to implement the steps or actions performed by the image stitching device 100.

The memory 103 may exist independently, and is connected to the processor 101 through the communications line 102. The memory 103 may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of exemplary but not restrictive description, many forms of RAM are available, such as a static RAM (SRAM), a dynamic RAM (DRAM), a synchronous DRAM (SDRAM), a double data rate SDRAM (DDR SDRAM), and an enhanced SDRAM (ESDRAM). It will be noted that the memories of the system and the devices described herein are intended to include, but are not limited to, these and any other suitable types of memories.

The communications interface 104 is configured to communicate with other devices or a communications network. For example, the communications network may be Ethernet, a radio access network (RAN), or a wireless local area network (WLAN), etc. The communications interface 104 may be universal asynchronous receiver/transmitter (UART), e.g., recommended standard 232 (RS232) interface, RS485 interface, RS422 interface. The communications interface 104 may also be controller area network (CAN) bus, or inter-integrated circuit (I2C) bus, etc.

Some embodiments of the present disclosure provide an image stitching method. The image stitching method may be performed at the image stitching device 100. The image stitching method will be described below in combination with the image stitching system shown in FIG. 1 and the image stitching device 100 shown in FIG. 2.

Figure 3:
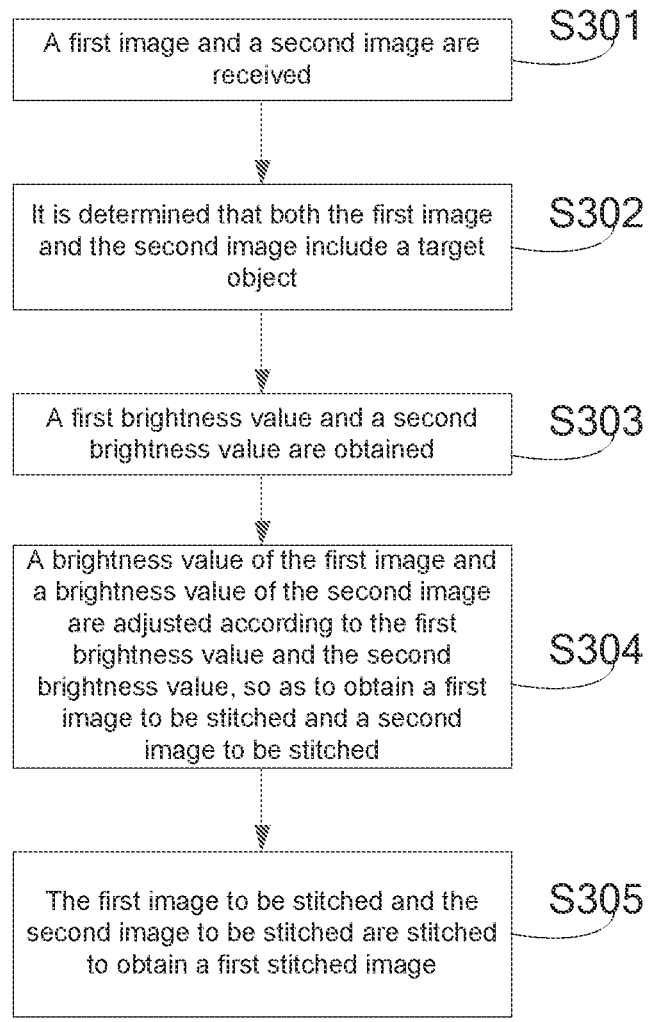
FIG. 3 is a flow diagram of an image stitching method, in accordance with some embodiments.

As shown in FIG. 3, the image stitching method includes steps 301 to 305 (S301 to S305).

In S301, a first image and a second image are received.

For example, this step is performed by the communications interface 104 of the image stitching device 100.

In some examples, the first image and the second image may be images captured at the same time by the plurality of image acquisition devices 200. For example, the first image may be an image captured by the image acquisition device 200 installed on the left mirror, and the second image may be an image captured by the image acquisition device 200 installed on the right mirror.

In some other examples, the first image and the second image may be images successively captured by a single image acquisition device 200, which is not limited herein.

In S302, it is determined that both the first image and the second image include a target object.

For example, this step is performed by the processor 101 of the image stitching device 100.

Figure 4:
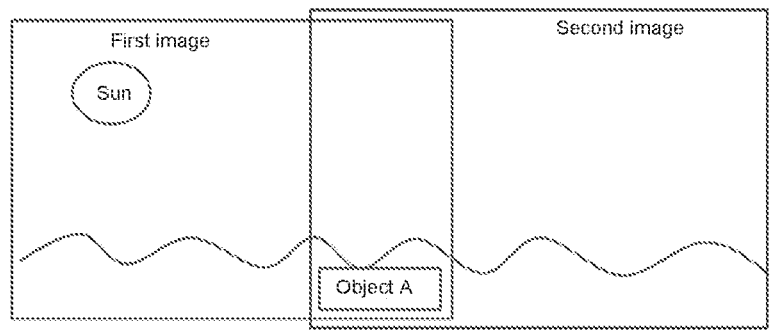
FIG. 4 is a schematic diagram showing a first image and a second image, in accordance with some embodiments.

In some examples, the target object includes, but is not limited to, a person, an animal, a car, a house, or a road. For example, as shown in FIG. 4, the target object is the object A.

In an implementation of S302, the image stitching device 100 may use an image recognition algorithm to determine whether the first image and the second image have an overlapping region. As shown in FIG. 4, if the image stitching device 100 determines that the first image and the second image have an overlapping region, and there is an object A in the overlapping region, the image stitching device 100 then determines, according to the image recognition result, the object A as the target object.

In some examples, there may be a plurality of objects in the overlapping region of the first image and the second image. In this case, the image stitching device 100 may determine the target object according to whether the objects include an object having a single color, sizes of the objects, and distances from the objects to the image acquisition device 200. For example, there are objects 1 and 2 in the overlapping region of the first image and the second image, the object 1 has two colors, e.g., red and green, and the object 2 has a single color, e.g., red. According to whether the objects include an object having a single color, the image stitching device 100 may determine the object 1 as the target object. In another example, the object which has the biggest size is determined as the target object. In yet another example, the object closest to the image acquisition device 200 is determined as the target object.

In S303, a first brightness value and a second brightness value are obtained. The first brightness value is a brightness value of the target object in the first image, and the second brightness value is a brightness value of the target object in the second image.

For example, this step is performed by the processor 101 of the image stitching device 100.

Different exposure conditions will result in different brightness values of the same object in the two images. For example, as shown in FIG. 4, "sun" indicates that there is a strong light source in the first image, which causes the brightness value of the object A in the first image to be lower than the brightness value of the object A in the second image.

For example, the target object is the object A, the brightness value of the object A in the first image is 30, and the brightness value of the object A in the second image is 60. The image stitching device 100 determines that the first brightness value is 30 and the second brightness value is 60.

It will be noted that in the embodiments of the present disclosure, the brightness value refers to brightness of colors. For example, a component "value" of the HSV color model can be used to describe the brightness value. The brightness value of an object may be calculated according to the brightness value of pixels included in an image of the object, for example, the brightness value of the object is an average "value" of pixels included in the image of the object.

In S304, a brightness value of the first image and a brightness value of the second image are adjusted according to the first brightness value and the second brightness value, so as to obtain a first image to be stitched and a second image to be stitched. The first image to be stitched has a same brightness range as the second image to be stitched.

For example, the processor 101 of the image stitching device 100 adjusts the brightness value of the first image and the brightness value of the second image according to the first brightness value (e.g., 30) and the second brightness value (e.g., 60), so as to obtain the first image to be stitched and the second image to be stitched.

Figure 5:
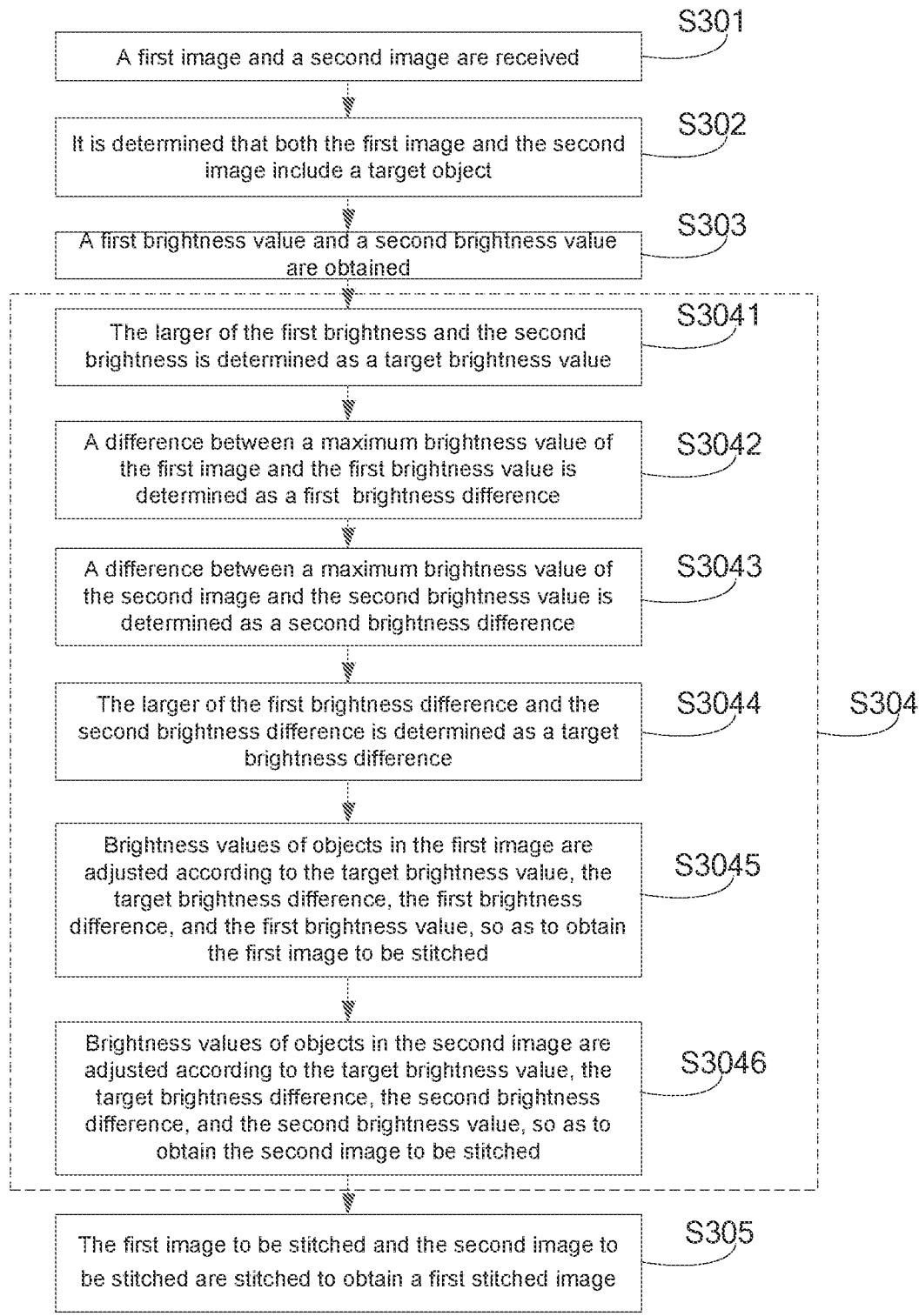
FIG. 5 is a flow diagram of another image stitching method, in accordance with some embodiments.

In some embodiments, as shown in FIG. 5, the step of adjusting the brightness value of the first image and the brightness value of the second image according to the first brightness value and the second brightness value, so as to obtain the first image to be stitched and the second image to be stitched (i.e., S304) may include steps 3041 to 3045 (S3041 to S3046).

In S3041, the larger of the first brightness value and the second brightness value is determined as a target brightness value.

For example, the first brightness value is 30, and the second brightness value is 60. The image stitching device 100 determines the second brightness value as the target brightness value. That is, the image stitching device 100 determines that the target brightness value is 60.

In S3042, a difference between a maximum brightness value of the first image and the first brightness value is determined as a first brightness difference.

In practical applications, a brightness range of an image is generally from 0 to 100. An example is taken to describe the following embodiments of the present disclosure, in which maximum brightness values of the first image and the second image are 100 and minimum brightness values of the first image and the second image are 0.

For example, the maximum brightness value of the first image is 100, and the first brightness value is 30. The image stitching device 100 determines that the first brightness difference is the difference between 100 and 30, i.e., 70.

In S3043, a difference between a maximum brightness value of the second image and the second brightness value is determined as a second brightness difference.

For example, the maximum brightness value of the second image is 100, and the second brightness value is 60. The image stitching device 100 determines that the second brightness difference is the difference between 100 and 60, i.e., 40.

In S3044, the larger of the first brightness difference and the second brightness difference is determined as a target brightness difference.

For example, the first brightness difference is 70, and the second brightness difference is 40. The image stitching device 100 determines the first brightness difference as the target brightness difference. That is, the image stitching device 100 determines that the target brightness difference is 70.

In S3045, brightness values of objects in the first image are adjusted according to the target brightness value, the target brightness difference, the first brightness difference, and the first brightness value, so as to obtain the first image to be stitched.

In some examples, if a brightness value of an object in the first image is less than the first brightness value, the brightness value of the object in the first image will be adjusted to a product of LB and K1. Where LB is the brightness value of the object in the first image, K1 is a first brightness conversion coefficient, and K1 equals to a ratio of the target brightness value and the first brightness value.

For example, the first brightness value is 30, the brightness value of the object B in the first image is 20, the target brightness value is 60, and K1 is a ratio of 60 and 30, i.e., 2. In this case, the brightness value of the object B in the first image is less than the first brightness value, and the image stitching device 100 adjusts the brightness value of the object B in the first image to a product of 20 and 2, i.e., 40.

In some examples, if the brightness value of the object in the first image is equal to the first brightness value, the brightness value of the object in the first image will be adjusted to LA3. Where LA3 is the target brightness value.

For example, the first brightness value is 30, a brightness value of an object A' in the first image is 30, and the target brightness value is 60. In this case, the brightness value of the object A' in the first image is equal to the first brightness value, and the image stitching device 100 adjusts the brightness value of the object A' in the first image to 60.

In some examples, if the brightness value of the object in the first image is greater than the first brightness value, the brightness value of the object in the first image will be adjusted to [LA3+(LB−LA1)×K2]. Where LA1 is the first brightness value, K2 is a second brightness conversion coefficient, and K2 equals to a ratio of the target brightness difference and the first brightness difference.

For example, the first brightness value is 30, a brightness value of an object C in the first image is 60, the target brightness value is 60, the target brightness difference is 70, the first brightness difference is 70, and K2 is a ratio of 70 and 70, i.e., 1. In this case, the brightness value of the object C in the first image is greater than the first brightness value, and the image stitching device 100 adjusts the brightness value of the object C in the first image to 60+(60−30)×1=90.

Figure 6:
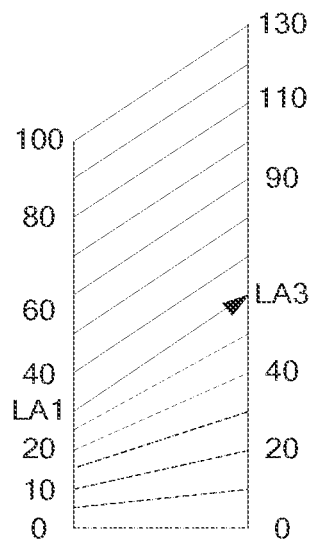
FIG. 6 is a schematic diagram showing a brightness conversion between a first image and a first image to be stitched, in accordance with some embodiments.

FIG. 6 is a schematic diagram showing a brightness conversion between the first image and the first image to be stitched in a case where the target brightness value is 60, the target brightness difference is 70, the first brightness difference is 70, and the first brightness value is 30. The data on the left is a brightness value of the object in the first image, and the data on the right is a brightness value of the object in the first image to be stitched after conversion. A brightness value at a left endpoint of a dotted line segment in the figure is a brightness value of a low-brightness object, and a brightness value at a left endpoint of a solid line segment in the figure is a brightness value of a high-brightness object. The low-brightness object refers to an object in the first image with a brightness value less than the first brightness value, for example, the object B. The high-brightness object refers to an object in the first image with a brightness value greater than the first brightness value, for example, the object C.

Figure 7:
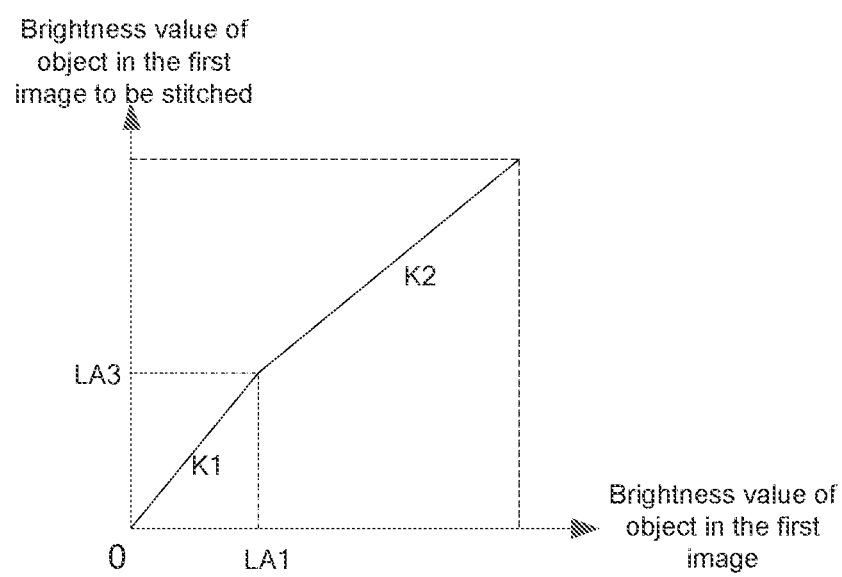
FIG. 7 is a schematic diagram showing a coordinate relationship between brightness values before and after conversion, in accordance with some embodiments.

FIG. 7 is a schematic diagram showing a coordinate relationship between brightness values before and after conversion. In FIG. 7, K1 and K2 are brightness conversion coefficients in S3045, the ordinate represents a brightness value of an object in the first image to be stitched, and the abscissa represents a brightness value of the object in the first image. LA1 on the horizontal axis is the brightness value of the target object in the first image, and LA3 on the vertical axis is the brightness value of the target object in the first image to be stitched.

In S3046, brightness values of objects in the second image are adjusted according to the target brightness value, the target brightness difference, the second brightness difference, and the second brightness value, so as to obtain the second image to be stitched.

In some examples, if a brightness value of an object in the second image is less than the second brightness value, the brightness value of the object in the second image will be adjusted to a product of LB and K1. Where LB is the brightness value of the object in the second image, and K1 is a ratio of the target brightness value and the second brightness value.

For example, the second brightness value is 60, a brightness value of an object D in the second image is 40, and the target brightness value is 60, and K1 is a ratio of 60 and 60, i.e., 1. In this case, the brightness value of the object D in the second image is less than the second brightness value, and the image stitching device 100 adjusts the brightness value of the object D in the second image to a product of 40 and 1, i.e., 40.

In some examples, if a brightness value of an object in the second image is equal to the second brightness value, the brightness value of the object in the second image will be adjusted to LA3. Where LA3 is the target brightness value.

For example, the second brightness value is 60, a brightness value of an object A" in the second image is 60, and the target brightness value is 60. In this case, the brightness value of the object A" in the second image is equal to the second brightness value, and the image stitching device 100 adjusts the brightness value of the object A" in the second image to 60.

In some examples, if a brightness value of an object in the second image is greater than the second brightness value, the brightness value of the object in the second image will be adjusted to [LA3+(LB−LA2)×K2]. Where LA2 is the second brightness value, and K2 is a ratio of the target brightness difference and the second brightness difference.

For example, the second brightness value is 60, a brightness value of an object E in the second image is 80, the target brightness value is 60, the target brightness difference is 70, the second brightness difference is 40, and K2 is a ratio of 70 and 40, i.e., 7/4. In this case, the brightness value of the object E in the second image is greater than the second brightness value, and the image stitching device 100 adjusts the brightness value of the object E in the second image to 60+(80−60)×(7/4)=95.

Figure 8:
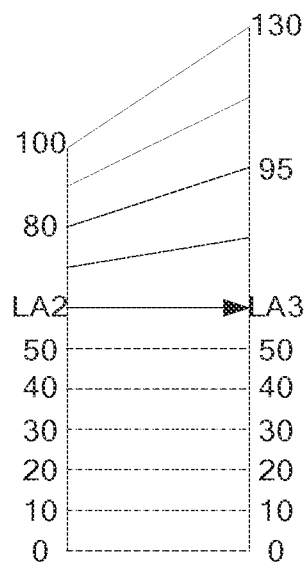
FIG. 8 is a schematic diagram showing a brightness conversion between a second image and a second image to be stitched, in accordance with some embodiments.

FIG. 8 is a schematic diagram showing a brightness conversion between the second image and the second image to be stitched in a case where the target brightness value is 60, the target brightness difference is 70, the second brightness difference is 40, and the second brightness value is 60. The data on the left is a brightness value of the object in the second image, and the data on the right is a brightness value of the object in the second image to be stitched. A brightness value at a left endpoint of a dotted line segment in the figure is a brightness value of a low-brightness object, and a brightness value at a left endpoint of a solid line segment in the figure is a brightness value of a high-brightness object. The low-brightness object refers to an object in the second image with a brightness value less than the second brightness value, for example, the object D in the second image. The high-brightness object refers to an object in the second image with a brightness value greater than the second brightness value, for example, the object E in the second image.

Figure 9:
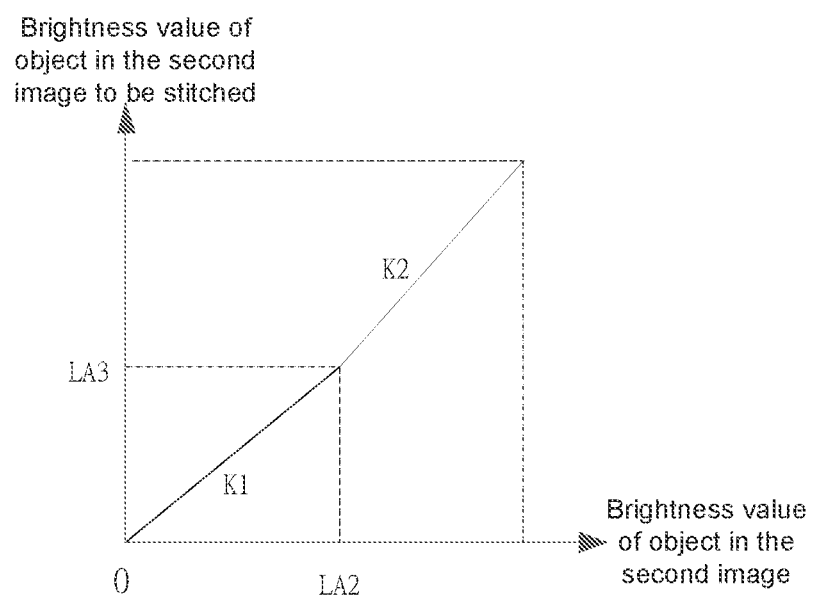
FIG. 9 is a schematic diagram showing another coordinate relationship between brightness values before and after conversion, in accordance with some embodiments.

FIG. 9 is a schematic diagram showing a coordinate relationship between brightness values before and after conversion. In FIGS. 9, K1 and K2 are brightness conversion coefficients in S3046, the ordinate represents a brightness value of an object in the second image to be stitched, and the abscissa represents a brightness value of the object in the second image. LA2 on the horizontal axis is the brightness value of the target object in the second image, and LA3 on the vertical axis is the brightness value of the target object in the second image to be stitched.

In S305, the first image to be stitched and the second image to be stitched are stitched to obtain a first stitched image.

For examples, this step is performed by the processor 101 of the image stitching device 100.

It may be seen from the above steps (S301 to S305) that brightness values of the images are adjusted according to brightness values of a same object in the images, which makes the brightness values of the same object in two images after adjustment are substantially the same. By stitching the adjusted images, a stitched image with small differences in the exposure conditions of regions may be obtained, which may solve a problem that exposure values of different regions in the stitched image are different when images with different exposure conditions are stitched.

Figure 10:
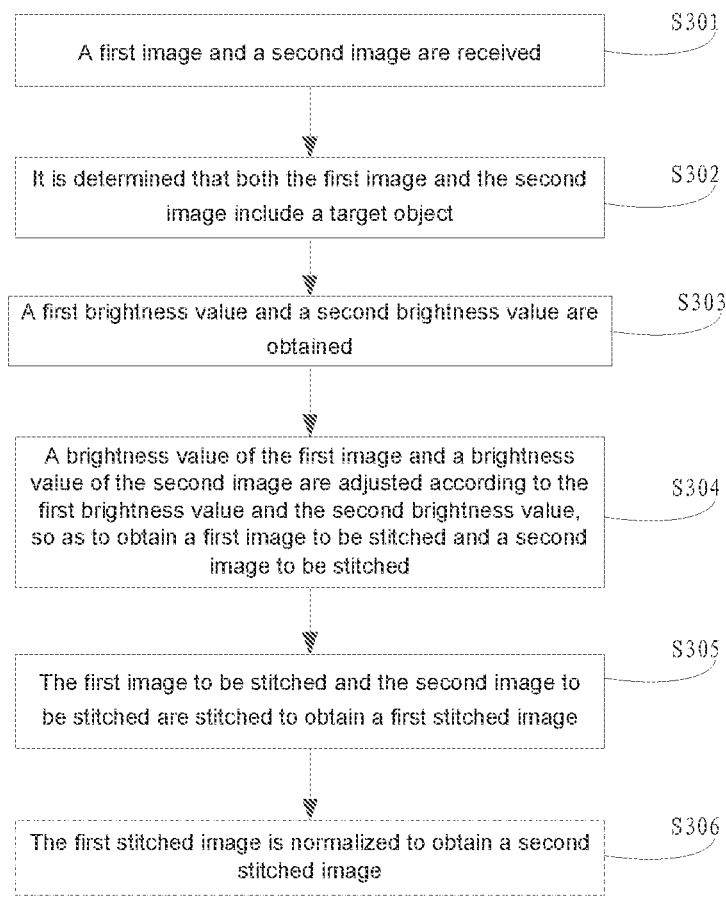
FIG. 10 is a flow diagram of yet another image stitching method, in accordance with some embodiments.

In practical applications, a standard brightness range of an image is generally from 0 to 100. In order to avoid a case where a brightness value range of the first stitched image exceeds the standard brightness range and achieve a good display effect, as shown in FIG. 10, in some embodiments, the image stitching method further includes step 306 (S306).

In S306, the first stitched image is normalized to obtain a second stitched image.

For example, this step is performed by the processor 101 of the image stitching device 100.

In some examples, the image stitching device 100 adjusts the brightness value of the first stitched image according to a compression coefficient to obtain the second stitched image. The compression coefficient equals to a ratio of a standard maximum brightness value and a maximum brightness value of the first stitched image. The standard maximum brightness value may be 100, or other values not exceeding 100, which is not limited herein.

For example, a brightness value of an object in the second stitched image is a product of LC and the compression coefficient, and LC is a brightness value of the object in the first stitched image.

For example, the maximum brightness value of the first stitched image is 130, and the standard maximum brightness value is 100. The compression coefficient equals to a ratio of 100 and 130, i.e., 10/13. A brightness value of an object F in the first stitched image is 65. The image stitching device 100 adjusts the brightness value of the object F to a product of 65 and 10/13, i.e., 50.

Figure 11:
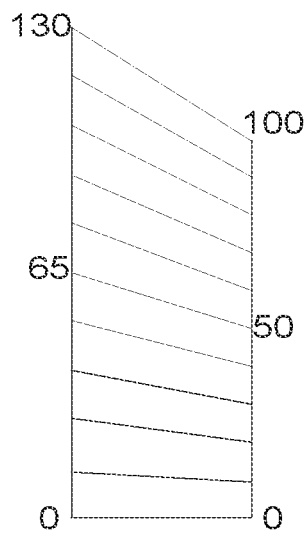
FIG. 11 is a schematic diagram showing a brightness conversion between a first stitched image and a second stitched image, in accordance with some embodiments.

FIG. 11 is a schematic diagram showing a brightness conversion between the first stitched image and the second stitched image in a case where the maximum brightness value of the first stitched image is 130 and the standard maximum brightness value is 100. The data on the left is a brightness value of the object in the first stitched image, and the data on the right is a brightness value of the object in the second stitched image after conversion. For example, a brightness value at a left endpoint of a solid line is a brightness value (e.g., 65) of an object F in the first stitched image, and a brightness value at a right endpoint of the solid line is a brightness value (e.g., 50) of the object F in the first stitched image after conversion.

The image stitching method described in S301 to S306 may also be applied to stitching of three or more images.

Figure 12:
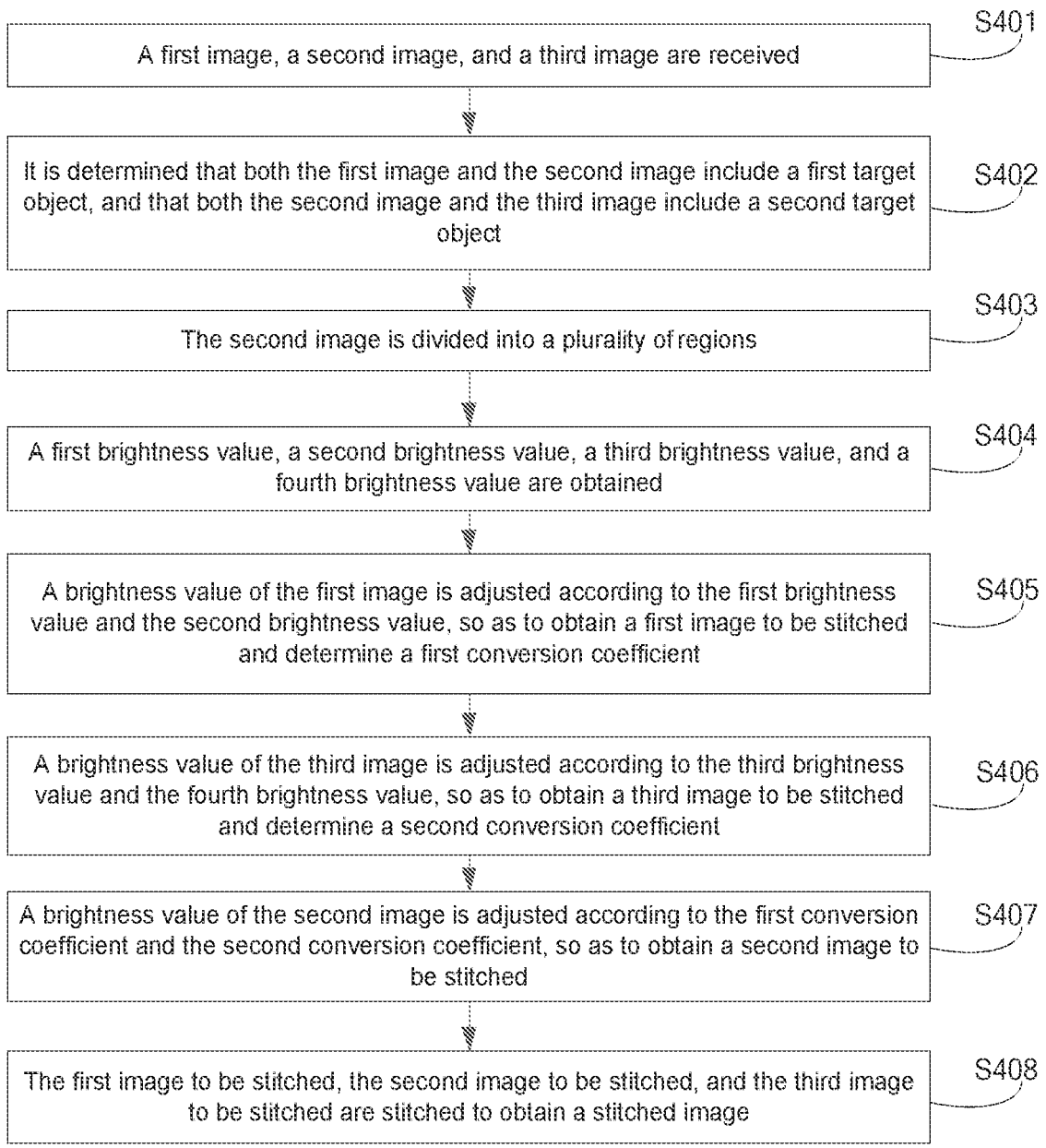
FIG. 12 is a flow diagram of yet another image stitching method, in accordance with some embodiments.

Some embodiments of the present disclosure provide another image stitching method for stitching three or more images. As shown in FIG. 12, the method includes steps 401 to 408 (S401 to S408).

In S401, a first image, a second image, and a third image are received.

In S402, it is determined that both the first image and the second image include a first target object, and that both the second image and the third image include a second target object.

Figure 13:
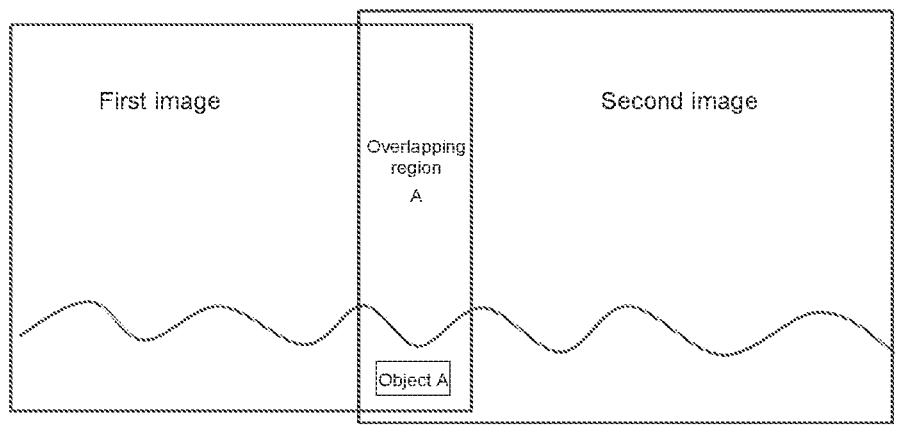
FIG. 13 is a schematic diagram showing a first image and a second image, in accordance with some embodiments.
Figure 14:
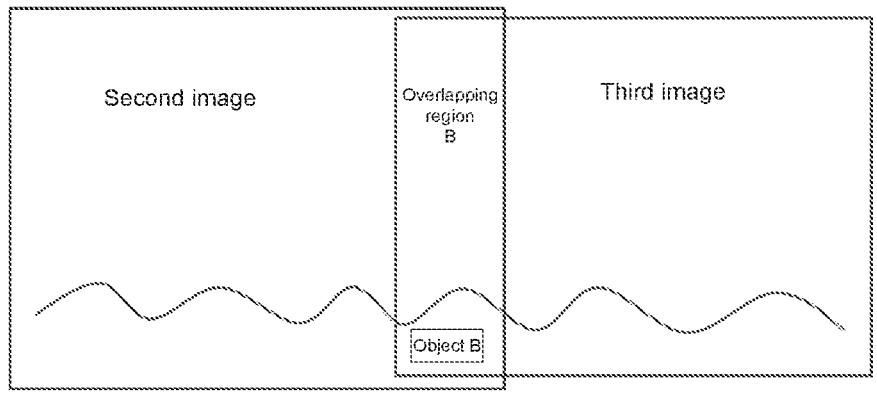
FIG. 14 is a schematic diagram showing a second image and a third image, in accordance with some embodiments.

For example, as shown in FIG. 13, the first image and the second image have an overlapping region A, and there is an object A in the overlapping region A. The image stitching device 100 determines that both the first image and the second image include the object A. As shown in FIG. 14, the second image and the third image have an overlapping region B, and there is an object B in the overlapping region B. The image stitching device 100 determines that both the second image and the third image include the object B.

In S403, the second image is divided into a plurality of regions.

The plurality of regions include at least a first region and a second region. The first region is a region of the second image in which the first target object is located, and the second region is a region of the second image in which the second target object is located.

Figure 15:
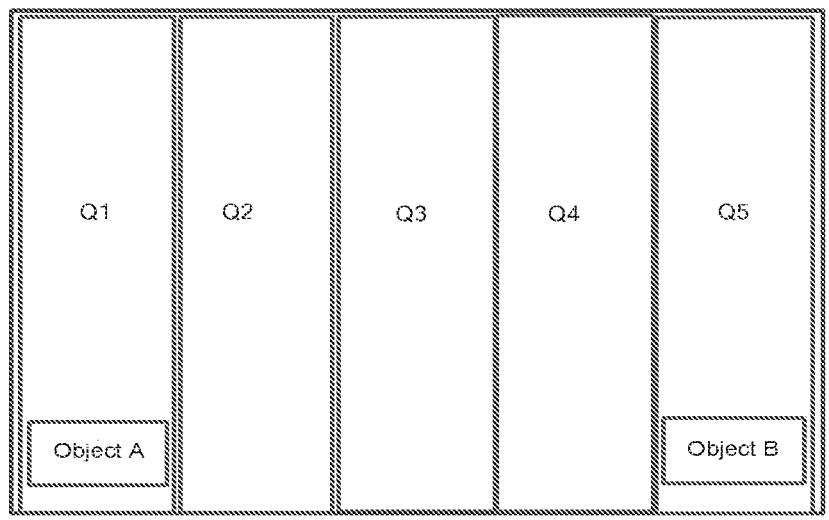
FIG. 15 is a schematic diagram of a second image, in accordance with some embodiments.

For example, as shown in FIG. 15, the image stitching device 100 divides the second image into five regions. The five regions of the second image are numbered as Q1, Q2, Q3, Q4, and Q5 in an order from left to right. The Q1 region is the first region, and the object A (i.e., the first target object) is located in the Q1 region. The Q5 region is the second region, and the object B (i.e., the second target object) is located in the Q5 region.

In some examples, the number of the plurality of regions of the second image may be determined according to a dimension of the first region, a dimension of the second region, and a dimension of the second image in a direction in which the plurality of regions are arranged. The dimension of an image or region includes, but is not limited to, a width of the image or region. The first region refers to an overlapping region of the first image and the second image. The second region refers to an overlapping region of the second image and the third image.

For example, the number of the plurality of regions of the second image may be determined according to a ratio of a width of the first region and a width of the second image, and a ratio of a width of the second region and the width of the second image. The first region is the overlapping region of the first image and the second image, and the second region is the overlapping region of the second image and the third image.

In an example, when the width of the first region and the width of the second region are equal, the number of the plurality of regions of the second image may be a ratio of a width of the second image and the width of the first region. For example, the ratio of the width of the first region and the width of the second image is 1/5, and the ratio of the width of the second region and the width of the second image is 1/5. The number of the plurality of regions of the second image may be 5.

In another example, when the width of the first region and the width of the second region are not equal, the number of the plurality of regions of the second image may be determined according to the following formula: $N=\text{ceil}[(W-W1-W2)/(W'+2)]$, where N is the number of the plurality of regions, W is the width of the second image, W1 is the width of the first region, W2 is the width of the second region, W' is the smaller of the width of the first region and the width of the second region, and ceil[ ] represents the ceiling function.

In some other examples, the number of the plurality of regions of the second image may be determined according to a brightness value of the first target object after conversion and a brightness value of the second target object after conversion.

In an example, the number of the plurality of regions of the second image may be determined according to a difference between the brightness value of the first target object after conversion and the brightness value of the second target object after conversion. For example, if a difference between the brightness value of the first target object after conversion and the brightness value of the second target object after conversion is large, the number of regions of the second image may be set to be large; and if the difference between the brightness value of the first target object after conversion and the brightness value of the second target object after conversion is small, the number of regions of the second image may be set to be small. For example, in a case where the difference between the brightness value of the first target object after conversion and the brightness value of the second target object after conversion is greater than a certain threshold, the N may be set to 6; otherwise, the N may be set to 3.This threshold may be set according to actual needs, which is not limited herein.

In another example, the brightness value of the first target object after conversion is LA', the brightness value of the second target object after conversion is LB' (LB' is greater than LA'), the number of the plurality of regions of the second image may be $$\text{ceil}\left[\frac{LB' - LA'}{\alpha}\right],$$

and α represents a preset brightness interval. For example, α is 5,10, 15, 20, etc.

In S404, a first brightness value, a second brightness value, a third brightness value, and a fourth brightness value are obtained.

The first brightness value is a brightness value of the first target object in the first image. The second brightness value is a brightness value of the first target object in the second image. The third brightness value is a brightness value of the second target object in the third image. The fourth brightness value is a brightness value of the second target object in the second image.

For example, the object A is the first target object, and the object B is the second target object. The brightness value of the object A in the first image is 30, and the brightness value of the object A in the second image is 60. The image stitching device 100 determines that the first brightness value is 30 and the second brightness value is 60. The brightness value of the object B in the third image is 70, and the brightness value of the object B in the second image is 80. The image stitching device 100 determines that the third brightness value is 70 and the fourth brightness value is 80.

In S405, a brightness value of the first image is adjusted according to the first brightness value and the second brightness value, so as to obtain a first image to be stitched and determine a first conversion coefficient.

The first conversion coefficient includes brightness conversion coefficients corresponding to the first region. The brightness conversion coefficients corresponding to the first region refer to the first brightness conversion coefficient and the second brightness conversion coefficient used in a process of converting the second image into an image to be stitched when the first image and the second image are stitched. Regarding a calculation method of the first conversion coefficient, reference may be made to the relevant description about the first brightness conversion coefficient and the second brightness conversion coefficient in S304.

In S406, a brightness value of the third image is adjusted according to the third brightness value and the fourth brightness value, so as to obtain a third image to be stitched and determine a second conversion coefficient.

The second conversion coefficient includes brightness conversion coefficients corresponding to the second region. The brightness conversion coefficients corresponding to the second region refer to the first brightness conversion coefficient and the second brightness conversion used in a process of converting the second image into the image to be stitched when the second image and the third image are stitched. Regarding a calculation method of the second conversion coefficient, reference may be made to the relevant description about the first brightness conversion coefficient and the second brightness conversion coefficient in S304.

In S407, a brightness value of the second image is adjusted according to the first conversion coefficient and the second conversion coefficient, so as to obtain a second image to be stitched.

Figure 16:
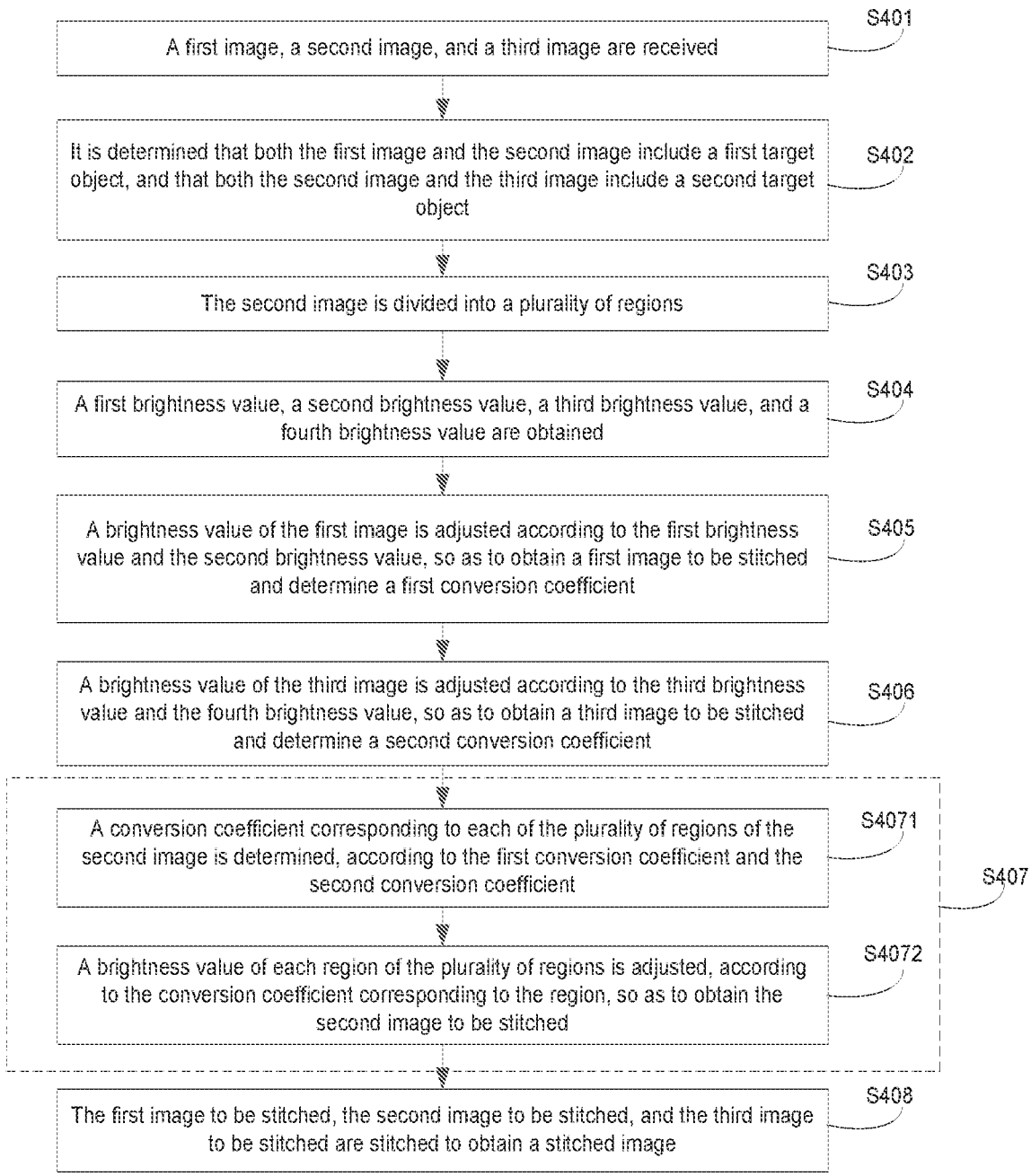
FIG. 16 is a flow diagram of yet another image stitching method, in accordance with some embodiments.

In some examples, as shown in FIG. 16, S407 may include steps 4071 and 4072 (S4071 and S4072).

In S4071, a conversion coefficient corresponding to each of the plurality of regions of the second image is determined, according to the first conversion coefficient and the second conversion coefficient.

The conversion coefficient corresponding to each region includes a first brightness conversion coefficient and a second brightness conversion coefficient corresponding to the region.

Figure 17:
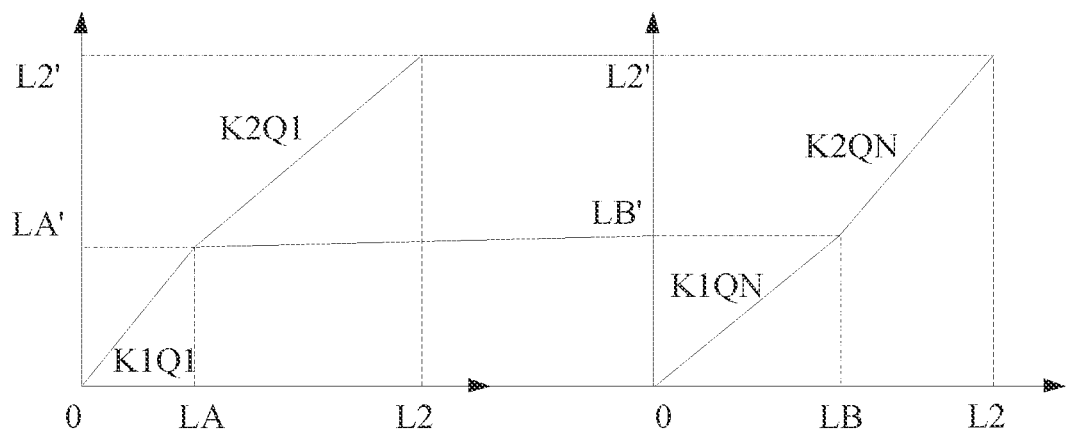
FIG. 17 is a schematic diagram showing conversion coefficients of regions of a second image, in accordance with some embodiments.

For example, the conversion coefficient corresponding to each region may be obtained through a linear transformation, according to the first conversion coefficient and the second conversion coefficient. FIG. 17 shows conversion coefficients corresponding to the first and second regions of the second image. On the horizontal axis in FIG. 17, LA is the second brightness value, LB is the fourth brightness value, and L2 is a maximum brightness value of the second image. On the vertical axis in FIG. 17, LA' is the brightness value of the first target object after conversion, LB' is the brightness value of the second target object after conversion, and L2' represents a maximum brightness value of the second image after conversion.

The conversion coefficient corresponding to each region in the second image and including a first and a second brightness conversion coefficient may be expressed as:

$$K1Qn=(n\times(LB'-LA')/N+LA')/(n\times(LB-LA)/N+LA); \text{ and}$$

$$K2Qn=(L2'-(n\times(LB'-LA')/N+LA'))/(L2-(n\times(LB-LA)/N+LA)).$$

Where N is the number of the plurality of regions of the second image, and n is a serial number of a region. For example, for the Q3 region, n is 3, and for the Q4 region, n is 4. K1Qn is a first brightness conversion coefficient K1 corresponding to an Qn region. For example, K1Q3 is a first brightness conversion coefficient K1 corresponding to the Q3 region. K2Qn is a second brightness conversion coefficient K2 corresponding to the Qn region. For example, K2Q4 is a second brightness conversion coefficient K2 corresponding to the Q4 region.

In S4072, a brightness value of each region of the plurality of regions is adjusted, according to the conversion coefficient corresponding to the region, so as to obtain the second image to be stitched.

For an implementation of S4072, reference may be made to S3045 or S3046, which will not be repeated herein.

In S408, the first image to be stitched, the second image to be stitched, and the third image to be stitched are stitched to obtain a stitched image.

Figure 18:
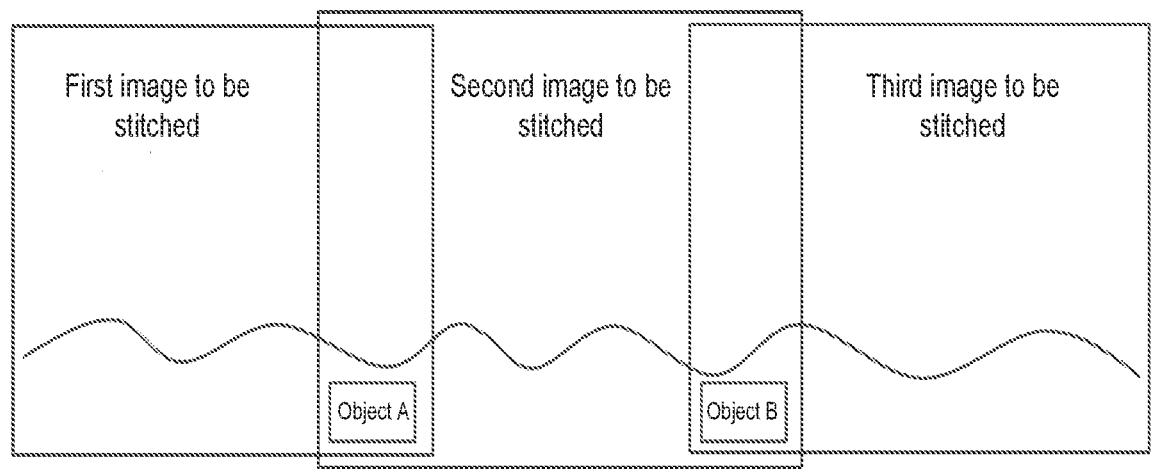
FIG. 18 is a schematic diagram of a stitched image, in accordance with some embodiments.

For example, as shown in FIG. 18, the image stitching device 100 stitches the first image to be stitched, the second image to be stitched, and the third image to be stitched to obtain the stitched image.

In the application scenario where there are three or more images to be stitched, the image stitching method described in S401 to S408 has a high stitching efficiency.

The foregoing mainly introduces the solutions provided by the embodiments of the present disclosure based on methods. In order to realize the solution provided by the embodiments of the present disclosure, hardware architecture and/or software modules configured to implement corresponding functions are included. Referring to the forgoing embodiments of the present disclosure, those skilled in the art will realize that the units and the steps of algorithm of examples described in the embodiments may be implemented in a form of hardware or combining hardware and computer software. It is depended on specific applications and design constraints of the technical solutions whether a certain function is implemented in a form of hardware or in a form of hardware driven by computer software. Professionals and technicians may use different methods for each specific application to implement the described functions, but such implementation should not be considered as exceeding the scope of the present disclosure.

In the embodiments of the present disclosure, the image stitching device 100 may be divided into functional modules according to the foregoing method. For example, each functional module is configured to implement a single function, or two or more functions may be integrated into one processing module. The above-mentioned integrated modules may be implemented in a form of hardware or a form of software function modules. It will be noted that the division of the device into modules in the embodiments of the present disclosure is illustrative, and is only one kind of logical functional division, and there may be other division manner in practical implementation.

Figure 19:
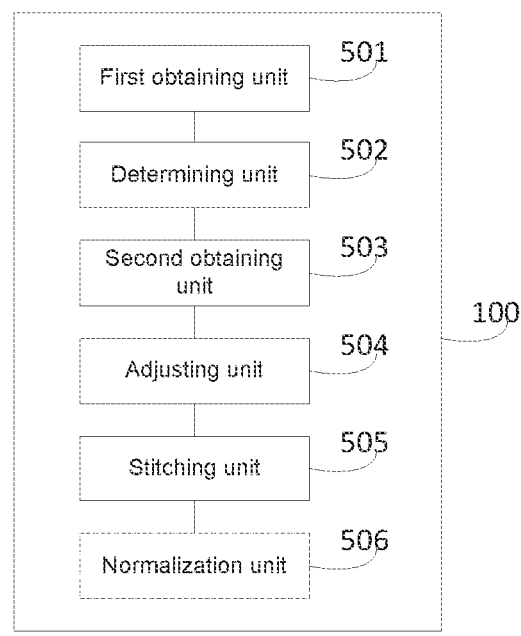
FIG. 19 is a block diagram of another image stitching device, in accordance with some embodiments.

Some embodiments of the present disclosure provide an image stitching device 100 used to perform the above-mentioned image stitching method. As shown in FIG. 19, the image stitching device 100 includes a first obtaining unit 501, a determining unit 502, a second obtaining unit 503, an adjusting unit 504, and a stitching unit 505.

The first obtaining unit 501 is used to receive the first image and the second image. The determining unit 502 is used to determine that both the first image and the second image received by the first obtaining unit 501 include the target object. The second obtaining unit 503 is used to obtain the first brightness value and the second brightness value. The first brightness value is the brightness value of the target object in the first image, and the second brightness value is the brightness value of the target object in the second image. The adjusting unit 504 is used to adjust the brightness value of the first image and the brightness value of the second image according to the first brightness value and the second brightness value obtained by the second obtaining unit 503, so as to obtain the first image to be stitched and the second image to be stitched, and the first image to be stitched has a same brightness range as the second image to be stitched. The stitching unit 505 is used to stitch the first image to be stitched and the second image to be stitched obtained by the adjusting unit 504, so as to obtain the first stitched image.

For example, with reference to FIG. 3, the first obtaining unit 501 may be used to perform S301. The determining unit 502 may be used to perform S302. The second obtaining unit 503 may be used to perform S303. The adjusting unit 504 may be used to perform S304. The stitching unit 505 may be used to perform S305.

The adjusting unit 504 is used to: determine the larger of the first brightness value and the second brightness value as the target brightness value; determine the difference between the maximum brightness value of the first image and the first brightness value as the first brightness difference; determine the difference between the maximum brightness value of the second image and the second brightness value as the second brightness difference; determine the larger of the first brightness difference and the second brightness difference as the target brightness difference; adjust the brightness values of objects in the first image according to the target brightness value, the target brightness difference, the first brightness difference, and the first brightness value, so as to obtain the first image to be stitched; and adjust the brightness values of objects in the second image, according to the target brightness value, the target brightness difference, the second brightness difference, and the second brightness value, so as to obtain the second image to be stitched.

For example, adjusting the brightness values of objects in the first image according to the target brightness value, the target brightness difference, the first brightness difference, and the first brightness value includes: if the brightness value of the object in the first image is less than the first brightness value, adjusting the brightness value of the object in the first image to a product of LB and K1, LB being the brightness value of the object in the first image, and K1 being a ratio of the target brightness value and the first brightness value; if the brightness value of the object in the first image is equal to the first brightness value, adjusting the brightness value of the object in the first image to LA3, LA3 being the target brightness value; and if the brightness value of the object in the first image is greater than the first brightness value, adjusting the brightness value of the object in the first image to [LA3+(LB−LA1)×K2], LA1 being the first brightness value, and K2 being a ratio of the target brightness difference and the first brightness difference.

In some examples, as shown in FIG. 19, the image stitching device 100 may further include a normalization unit 506. The normalization unit 506 is used to normalize the first stitched image obtained by the stitching unit 505, so as to obtain a second stitched image. For example, with reference to FIG. 10, the normalization unit 506 may be used to perform S306.

In some examples, as shown in FIGS. 2 and 19, the first obtaining unit 501, the determining unit 502, the second obtaining unit 503, the adjusting unit 504, the stitching unit 505, and the normalization unit 506 in FIG. 19 call programs stored in the memory 103 via the communications line 102 through the processor 101 in FIG. 2 to perform the above-mentioned image stitching method.

Figure 20:
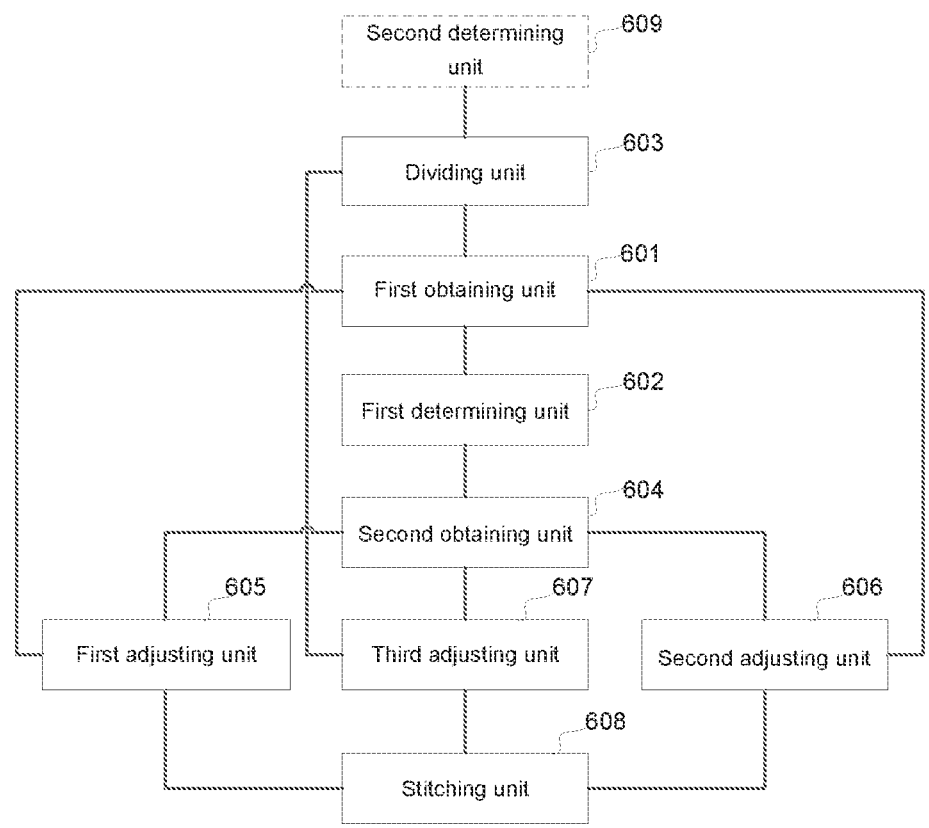
FIG. 20 is a block diagram of yet another image stitching device, in accordance with some embodiments.

Some embodiments of the present disclosure provide another image stitching device 100 used to perform the above-mentioned image stitching method. As shown in FIG. 20, the image stitching device 100 includes a first obtaining unit 601, a first determining unit 602, a dividing unit 603, a second obtaining unit 604, a first adjusting unit 605, a second adjusting unit 606, a third adjusting unit 607, and a stitching unit 608.

The first obtaining unit 601 is used to obtain the first image, the second image, and the third image.

The first determining unit 602 is used to determine that both the first image and the second image obtained by the first obtaining unit 601 include the first target object, and that both the second image and the third image obtained by the first obtaining unit 601 include the second target object.

The dividing unit 603 is used to divide the second image into a plurality of regions. The plurality of regions include at least a first region and a second region. The first region is a region of the second image in which the first target object is located, and the second region is a region of the second image in which the second target object is located.

The second obtaining unit 604 is used to obtain the first brightness value, the second brightness value, the third brightness value, and the fourth brightness value. The first brightness value is the brightness value of the first target object in the first image, the second brightness value is the brightness value of the first target object in the second image, the third brightness value is the brightness value of the second target object in the third image, and the fourth brightness value is the brightness value of the second target object in the second image.

The first adjusting unit 605 is used to adjust the brightness value of the first image according to the first brightness value and the second brightness value, so as to obtain the first image to be stitched and determine the first conversion coefficient. The first conversion coefficient includes the brightness conversion coefficients corresponding to the first region.

The second adjusting unit 606 is used to adjust the brightness value of the third image according to the third brightness value and the fourth brightness value, so as to obtain the third image to be stitched and determine the second conversion coefficient. The second conversion coefficient includes the brightness conversion coefficients corresponding to the second region.

The third adjusting unit 607 is used to adjust the brightness value of the second image according to the first conversion coefficient and second conversion coefficient, so as to obtain the second image to be stitched.

The stitching unit 608 is used to stitch the first image to be stitched, the second image to be stitched, and the third image to be stitched, so as to obtain a stitched image.

For example, with reference to FIG. 12, the first obtaining unit 601 may be used to perform S401. The first determining unit 602 may be used to perform S402. The dividing unit 603 may be used to perform S403. The second obtaining unit 604 may be used to perform S404. The first adjusting unit 605 may be used to perform S405. The second adjusting unit 606 may be used to perform S406. The third adjusting unit 607 may be used to perform S407. The stitching unit 608 may be used to perform S408.

For example, the third adjusting unit 607 is used to: determine the conversion coefficient corresponding to each of the plurality of regions of the second image, according to the first conversion coefficient and the second conversion coefficient; and adjust the brightness value of each region of the plurality of regions, according to the conversion coefficient corresponding to the region, so as to obtain the second image to be stitched.

In some examples, as shown in FIG. 20, the image stitching device 100 further includes a second determining unit 609. The second determining unit 609 is used to determine the number of the plurality of regions according to a brightness value of the first target object after conversion and a brightness value of the second target object after conversion; or determine the number of the plurality of regions according to the dimension of the first region, the dimension of the second region, and the dimension of the second image in a direction in which the plurality of regions are arranged.

For example, as shown in FIGS. 2 and 20, the first obtaining unit 601, the first determining unit 602, the dividing unit 603, the second obtaining unit 604, the first adjusting unit 605, the second adjusting unit 606, the third adjusting unit 607, the stitching unit 608, and the second determining unit 609 in FIG. 20 calls programs stored in the memory 103 via the communications line 102 through the processor 101 in FIG. 2 to perform steps in the above-mentioned image stitching method.

Some embodiments of the present disclosure provide a non-transitory computer-readable storage medium storing one or more programs. The one or more programs include instructions that, when executed by an image stitching device, cause the image stitching device to perform steps in any of the above-mentioned image stitching methods.

In some examples, the non-transitory computer-readable storage media include, but are not limited to, magnetic storage devices (such as hard disks, floppy disks, or tapes), optical disks (such as CD (compact disk), and DVD (digital versatile disk)), smart cards, and flash memory devices (such as erasable programmable read-only memory (EPROM), cards, rods or key drivers).

Some embodiments of the present disclosure provide a computer program product including instructions stored in a non-transitory computer-readable storage medium. The instructions, when executed by a computer, cause the computer to perform steps in any of the above-mentioned image stitching methods.

It will be noted that the above-mentioned units may be processors that are set separately, or may be integrated in a certain processor of a controller for implementation. In addition, they may also be stored in the memory of the controller in a form of a program code, which is called by a certain processor of the controller to perform the functions of the above-mentioned units. The processor herein may be a CPU, or an ASIC, or one or more integrated circuits configured to implement the embodiments of the present disclosure.

It will be understood that in various embodiments of the present disclosure, the sequence number of the steps does not mean an order of execution. The order of execution of the steps should be determined by the internal logic of the steps, and the sequence number of the steps should not limit implementation of the embodiments of the present disclosure.

According to the description of the embodiments, a person of ordinary skill in the art will realize that the units and algorithm steps of the examples can be implemented by electronic hardware or a combination of computer software and the electronic hardware. Whether a certain function is implemented by hardware or software depends on specific applications and design constraints of the technical solution. Professionals and technicians may use different methods for each specific application to implement the described functions, but such implementation should not be considered as exceeding the scope of the present disclosure.

Those skilled in the art may clearly understand that, for convenience and conciseness of description, specific working processes of the above-described system, devices, and units may refer to corresponding processes in the foregoing method embodiments, which will not be repeated here.

It will be understood that the system, devices, and methods disclosed in the embodiments of the present disclosure may be implemented in other ways. For example, the device embodiments described above are merely illustrative, and the division of the device into units is only one type of logical functional division, and other division modes may be used in practical implementation. For example, a plurality of units or components may be combined or integrated into another system, or some features may be ignored, or not executed. In addition, the shown or discussed mutual coupling or direct coupling or communication connection may be indirect coupling or communication connection through some interfaces, devices or units, and may be of electrical, mechanical or other forms.

The units described as separate parts may be or may not be physically separate, and parts displayed as units may be or may not be physical units, i.e., may be located in one position, or may be distributed on a plurality of network units. Some or all of the units may be selected according to actual needs to achieve the purpose of the solutions of the embodiments.

In addition, the functional units in various embodiments of the present disclosure may be integrated into one processing unit, or each unit may exist separately and physically, or two or more units may be integrated into one unit.

The foregoing descriptions are merely specific implementation manners of the present disclosure, but the protection scope of the present disclosure is not limited thereto, and changes or replacements that any person skilled in the art could conceive of within the technical scope disclosed by the present disclosure should be within the protection scope of the present disclosure. Therefore, the protection scope of the present disclosure shall be subject to the protection scope of the claims.

What is claimed is:

1. An image stitching device, comprising:
    a communications interface configured to receive a first image and a second image; and
    a processor connected to the communications interface and configured to:
        determine that both the first image and the second image include a target object;
        obtain a first brightness value and a second brightness value, the first brightness value being a brightness value of the target object in the first image, and the second brightness value being a brightness value of the target object in the second image;
        adjust a brightness value of the first image and a brightness value of the second image according to the first brightness value and the second brightness value, so as to obtain a first image to be stitched and a second image to be stitched; the first image to be stitched having a same brightness range as the second image to be stitched; and
        stitch the first image to be stitched and the second image to be stitched to obtain a first stitched image;
    wherein adjusting the brightness value of the first image and the brightness value of the second image according to the first brightness value and the second brightness value, so as to obtain the first image to be stitched and the second image to be stitched includes:
        determine the larger of the first brightness value and the second brightness value as a target brightness value;
        determine a difference between a maximum brightness value of the first image and the first brightness value as a first brightness difference;
        determine a difference between a maximum brightness value of the second image and the second brightness value as a second brightness difference;
        determine the larger of the first brightness difference and the second brightness difference as a target brightness difference;
        adjust brightness values of objects in the first image, according to the target brightness value, the target brightness difference, the first brightness difference, and the first brightness value, so as to obtain the first image to be stitched; and
        adjust brightness values of objects in the second image, according to the target brightness value, the target brightness difference, the second brightness difference, and the second brightness value, so as to obtain the second image to be stitched.

2. The image stitching device according to claim 1, wherein the processor is configured to:
    if a brightness value of an object in the first image is less than the first brightness value, adjust the brightness value of the object in the first image to a product of LB and K1, wherein LB is the brightness value of the object in the first image, K1 is a first brightness conversion coefficient, and K1 equals to a ratio of the target brightness value and the first brightness value;
    if the brightness value of the object in the first image is equal to the first brightness value, adjust the brightness value of the object in the first image to LA3, wherein LA3 is the target brightness value; and
    if the brightness value of the object in the first image is greater than the first brightness value, adjust the brightness value of the object in the first image to LA3+(LB−LA1)×K2, wherein LA1 is the first brightness value, K2 is a second brightness conversion coefficient, and K2 equals to a ratio of the target brightness difference and the first brightness difference.

3. The image stitching device according to claim 1, wherein the processor is further configured to:
    normalize the first stitched image to obtain a second stitched image.

4. An image stitching device, comprising:
    a communications interface configured to receive a first image, a second image, and a third image; and
    a processor connected to the communications interface and configured to:
        determine that both the first image and the second image include a first target object, and that both the second image and the third image include a second target object;
        divide the second image into a plurality of regions that include at least a first region and a second region, the first region being a region of the second image in which the first target object is located, and the second region being a region of the second image in which the second target object is located;
        obtain a first brightness value, a second brightness value, a third brightness value and a fourth brightness value, the first brightness value being a brightness value of the first target object in the first image, the second brightness value being a brightness value of the first target object in the second image, the third brightness value being a brightness value of the second target object in the third image, and the fourth brightness value being a brightness value of the second target object in the second image;
        adjust a brightness value of the first image according to the first brightness value and the second brightness value, so as to obtain a first image to be stitched and determine a first conversion coefficient, and the first conversion coefficient including brightness conversion coefficients corresponding to the first region;
        adjust a brightness value of the third image according to the third brightness value and the fourth brightness value, so as to obtain a third image to be stitched and determine a second conversion coefficient, and the second conversion coefficient including brightness conversion coefficients corresponding to the second region;

adjust a brightness value of the second image according to the first conversion coefficient and the second conversion coefficient, so as to obtain a second image to be stitched; and
stitch the first image to be stitched, the second image to be stitched, and the third image to be stitched to obtain a stitched image;
wherein the adjusting the brightness value of the second image according to the first conversion coefficient and the second conversion coefficient, so as to obtain the second image to be stitched includes:
determine a conversion coefficient corresponding to each region of the plurality of regions of the second image, according to the first conversion coefficient and the second conversion coefficient; and
adjust a brightness value of each region of the plurality of regions, according to the conversion coefficient corresponding to the region, so as to obtain the second image to be stitched;
wherein calculating the first conversion coefficient includes the following steps:
determining the larger of the first brightness value and the second brightness value as a first target brightness value;
determining a difference between a maximum brightness value of the first image and the first brightness value as a first brightness difference;
determining a difference between a maximum brightness value of the second image and the second brightness value as a second brightness difference;
determining the larger of the first brightness difference and the second brightness difference as a first target brightness difference; and
calculating the first conversion coefficient according to the first target brightness value, the first target brightness difference, the second brightness difference, and the second brightness value;
wherein calculating the second conversion coefficient includes the following steps:
determining the larger of the third brightness value and the fourth brightness value as a second target brightness value;
determining a difference between a maximum brightness value of the third image and the third brightness value as a third brightness difference;
determining a difference between a maximum brightness value of the fourth image and the fourth brightness value as a fourth brightness difference;
determining the larger of the third brightness difference and the fourth brightness difference as a second target brightness difference; and
calculating the second conversion coefficient according to the second target brightness value, the second target brightness difference, the third brightness difference, and the third brightness value.

5. The image stitching device according to claim 4, wherein the processor is further configured to:
determine several the plurality of regions, according to a brightness value of the first target object after conversion and a brightness value of the second target object after conversion; or
determine the number of the plurality of regions, according to a dimension of the first region, a dimension of the second region, and a dimension of the second image in a direction in which the plurality of regions are arranged.

6. An image stitching method, comprising:
receiving a first image and a second image;
determining that both the first image and the second image include a target object;
obtaining a first brightness value and a second brightness value, the first brightness value being a brightness value of the target object in the first image, and the second brightness value being a brightness value of the target object in the second image;
adjusting a brightness value of the first image and a brightness value of the second image according to the first brightness value and the second brightness value, so as to obtain a first image to be stitched and a second image to be stitched, and the first image to be stitched having a same brightness range as the second image to be stitched; and
stitching the first image to be stitched and the second image to be stitched to obtain a first stitched image;
wherein adjusting the brightness value of the first image and the brightness value of the second image according to the first brightness value and the second brightness value, so as to obtain the first image to be stitched and the second image to be stitched includes:
determining the larger of the first brightness value and the second brightness value as a target brightness value;
determining a difference between a maximum brightness value of the first image and the first brightness value as a first brightness difference;
determining a difference between a maximum brightness value of the second image and the second brightness value as a second brightness difference;
determining the larger of the first brightness difference and the second brightness difference as a target brightness difference;
adjusting brightness values of objects in the first image, according to the target brightness value, the target brightness difference, the first brightness difference, and the first brightness value, so as to obtain the first image to be stitched; and
adjusting brightness values of objects in the second image, according to the target brightness value, the target brightness difference, the second brightness difference, and the second brightness value, so as to obtain the second image to be stitched.

7. The image stitching method according to claim 6, wherein adjusting the brightness values of the objects in the first image, according to the target brightness value, the target brightness difference, the first brightness difference, and the first brightness value includes:
if a brightness value of an object in the first image is less than the first brightness value, adjusting the brightness value of the object in the first image to a product of LB and K1, wherein LB is the brightness value of the object in the first image, K1 is a first brightness conversion coefficient, and K1 equals to a ratio of the target brightness value and the first brightness value;
if the brightness value of the object in the first image is equal to the first brightness value, adjusting the brightness value of the object in the first image to LA3, wherein LA3 is the target brightness value; and
if the brightness value of the object in the first image is greater than the first brightness value, adjusting the brightness value of the object in the first image to LA3+(LB−LA1)×K2, wherein LA1 is the first brightness value, K2 is a second brightness conversion coefficient, and K2 equals to a ratio of the target brightness difference and the first brightness difference.

8. The image stitching method according to claim 6, further comprising:
    normalizing the first stitched image to obtain a second stitched image.

9. An image stitching method, performed at the image stitching device according to claim 5, the image stitching method comprising:
    receiving the first image, the second image, and the third image;
    determining that both the first image and the second image include the first target object, and that both the second image and the third image include the second target object;
    dividing the second image into the plurality of regions that include at least the first region and the second region, the first region being the region of the second image in which the first target object is located, and the second region being the region of the second image in which the second target object is located;
    obtaining the first brightness value, the second brightness value, the third brightness value, and the fourth brightness value, the first brightness value being the brightness value of the first target object in the first image, the second brightness value being the brightness value of the first target object in the second image, the third brightness value being the brightness value of the second target object in the third image, and the fourth brightness value being the brightness value of the second target object in the second image;
    adjusting the brightness value of the first image according to the first brightness value and the second brightness value, so as to obtain the first image to be stitched and determine the first conversion coefficient, the first conversion coefficient includes the brightness conversion coefficients corresponding to the first region;
    adjusting the brightness value of the third image according to the third brightness value and the fourth brightness value, so as to obtain the third image to be stitched and determine the second conversion coefficient, the second conversion coefficient includes the brightness conversion coefficients corresponding to the second region;
    adjusting the brightness value of the second image according to the first conversion coefficient and the second conversion coefficient, so as to obtain the second image to be stitched; and
    stitching the first image to be stitched, the second image to be stitched, and the third image to be stitched to obtain a stitched image;
    wherein the adjusting the brightness value of the second image according to the first conversion coefficient and the second conversion coefficient, so as to obtain the second image to be stitched includes:
        determining a conversion coefficient corresponding to each region of the plurality of regions of the second image, according to the first conversion coefficient and the second conversion coefficient; and
        adjusting a brightness value of each region of the plurality of regions, according to a conversion coefficient corresponding to the region, so as to obtain the second image to be stitched;
    wherein calculating the first conversion coefficient includes the following steps:
        determining the larger of the first brightness value and the second brightness value as a first target brightness value;
        determining a difference between a maximum brightness value of the first image and the first brightness value as a first brightness difference;
        determining a difference between a maximum brightness value of the second image and the second brightness value as a second brightness difference;
        determining the larger of the first brightness difference and the second brightness difference as a first target brightness difference; and
        calculating the first conversion coefficient according to the first target brightness value, the first target brightness difference, the second brightness difference, and the second brightness value;
    wherein calculating the second conversion coefficient includes the following steps:
        determining the larger of the third brightness value and the fourth brightness value as a second target brightness value;
        determining a difference between a maximum brightness value of the third image and the third brightness value as a third brightness difference;
        determining a difference between a maximum brightness value of the fourth image and the fourth brightness value as a fourth brightness difference;
        determining the larger of the third brightness difference and the fourth brightness difference as a second target brightness difference; and
        calculating the second conversion coefficient according to the second target brightness value, the second target brightness difference, the third brightness difference, and the third brightness value.

10. The image stitching method according to claim 9, further comprising:
    determining a number of the plurality of regions, according to a brightness value of the first target object after conversion and a brightness value of the second target object after conversion; or
    determining the number of the plurality of regions, according to a dimension of a first region, a dimension of a second region, and a dimension of the second image in a direction in which the plurality of regions are arranged.

11. A non-transitory computer-readable storage medium storing one or more computer programs, wherein the one or more computer programs include computer instructions that, when executed by an image stitching device, cause the image stitching device to perform steps in the image stitching method according to claim 6.

12. A non-transitory computer-readable storage medium storing one or more computer programs, wherein the one or more computer programs include computer instructions that, when executed by an image stitching device, cause the image stitching device to perform steps in the image stitching method according to claim 9.

13. A computer program product, comprising computer instructions stored in a non-transitory computer-readable storage medium, wherein the computer instructions, when executed by a computer, cause the computer to perform steps in the image stitching method according to claim 6.

14. A computer program product, comprising computer instructions stored in a non-transitory computer-readable storage medium, wherein the computer instructions, when executed by a computer, cause the computer to perform steps in the image stitching method according to claim 9.

* * * * *